INVENTORS
GARDNER P. WILSON
RAFN STEFANSSON
BY
ATTORNEY

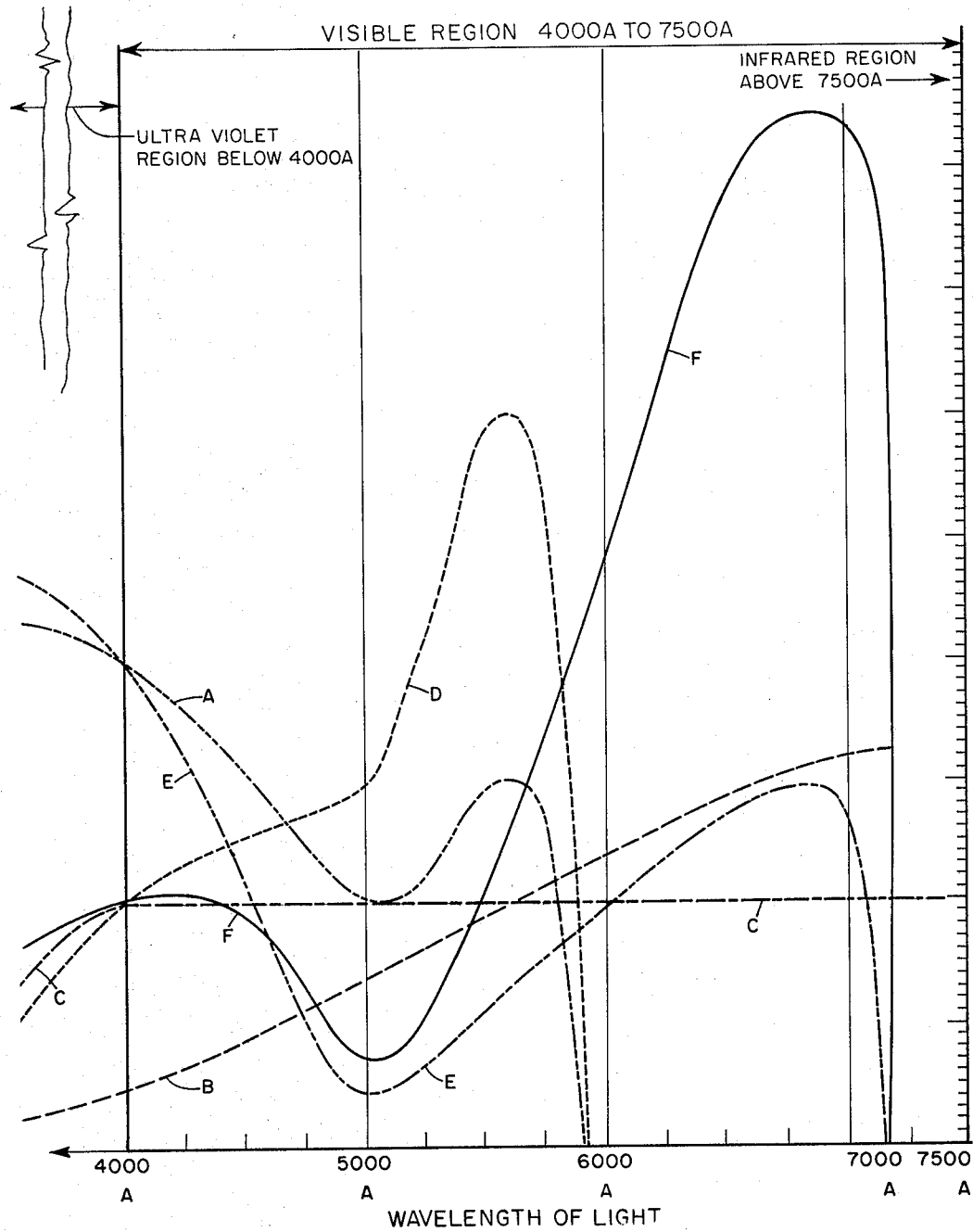

United States Patent Office 3,245,083
Patented Apr. 5, 1966

3,245,083
DIRECT WRITING OSCILLOGRAPH
Gardner P. Wilson, Pasadena, and Rafn Stefansson, San Marino, Calif., assignors to Clevite Corporation, a corporation of Ohio
Filed Mar. 12, 1965, Ser. No. 439,394
7 Claims. (Cl. 346—109)

This is a continuation-in-part of previous application Serial No. 156,428, now abandoned, filed December 1, 1961, in the names of the same inventors, for a Direct Writing Oscillograph.

This invention pertains to an improved device for direct recording visible light on a moving visible light-sensitive film or chart paper, to produce in the film or chart paper a latent trace which photolyzes or intensifies very quickly into a visible trace, and which will operate over a very wide range of writing speeds from very slow up to very high writing speeds on the order of 20,000 to 40,000 inches per second.

The over-all device and system of the present invention operates as a band-pass filter to record those frequencies which lie in the visible range, and to completely reject or to substantially reject infrared frequencies above the visible and ultraviolet frequencies below the visible range.

The system includes an incandescent light source, optical elements of glass which will readily transmit the visible frequencies generated by the light source and film or chart paper which will record a latent trace of the transmitted frequencies and which will quickly make the trace visible by photolyzation. Each of these enumerated elements cooperates with the others so that the visible record which is obtained is derived essentially only from light in the visible range of wave lengths, and the system as a whole is not dependent upon energy in the ultraviolet or infrared ranges of wave lengths. In addition to the system comprising a band-pass filter which passes visible light and rejects ultraviolet and infrared, it must correlate the intensity of the usable visible light, the light gathering and filtering ability of the optical elements including a mirror, and the sensitivity of the film or paper to assure that the spot of light which exposes the film is sufficiently bright in the proper wave length to provide a good record, even though the film or chart may be driven at different speeds over a wide range of speeds.

The band-pass filter effect is achieved by utilizing a film which is insensitive to energy having frequencies in the infrared region, and by utilizing an energy source (light source) which emits energy rich in the visible range of frequencies and poor in the ultraviolet range of frequencies. Glass bulbs and optics are used which readily transmit the visible frequencies but which substantially filter out the ultraviolet energy. Thus 90–95% of the useful energy in the system lies in the visible range of frequencies.

In the prior art it has been known to record on light sensitive paper or film utilizing incandescent light, and to develop the paper or film by a wet process to produce a visible trace which is permanent. The greatest disadvantages of this system are the delays inherent in the wet developing process, and in the wet developing process itself which requires specific chemicals, temperatures, fixing baths, washing time, darkrooms, etc.

It has also been known that ultraviolet light could be used, instead of incandescent light, with paper or film which is sensitive to the ultraviolet rays, and either wet processing was used to bring out the latent trace or the latent trace was photolyzed over a relatively short period of time to bring out the trace. Reasonable recording speeds were obtained with the matched ultraviolet light and ultraviolet sensitive paper and the photolyzation obviated the necessity of wet development. However, the ultraviolet system entails many disadvantages; among them being the following:

Mercury arc lamps are expensive and they operate at high pressure compared to incandescent lamps. About ten times the wattage is required for the mercury lamp.

Mercury lamps are subject to explosion and their light is very injurious to eyes, requiring use of welder's goggles when slightly prolonged exposure is expected. Mercury poisoning is very dangerous, and the presence of mercury in any form, even in batteries, is forbidden in installations where nuclear energy is involved. Thus a mercury arc recorder cannot be used safely around nuclear energy submarines, plants, etc.

Mercury arc systems require quartz optics in order to transmit ultraviolet light instead of ordinary glass which leads to further cost compared to an incandescent system.

The life of a mercury arc lamp is low compared to an incandescent lamp, some lasting only a few hours.

Another shortcoming of the mercury arc lamp lies in the fact that it is not a good point-source of light due to the fact that it wanders and thus causes spurious indications of data on the recorded trace. It is also a source of radio interference noise as it is a type of arc transmitter.

All-in-all, the disadvantages of a mercury-arc system are so numerous and serious that it would seem no one would use it. That it is being used is due to two outstanding advantages of the ultraviolet or mercury arc system over the old incandescent systems; namely, wet processing of the latent trace is not required, and reasonably high recording speeds are available.

The present invention for the first time does away with the mercury arc ultraviolet lamp with all of its serious disadvantages and limitations, yet retains its tremendous advantages of substantially instantaneous dry presentation of the data in a visible form, and the system of the present invention achieves writing speeds up to about 40,000 inches per second.

It is an object of the present invention to provide a direct recording device and system for recording data at speeds up to about 40,000 inches per second, using a stable incandescent light source, glass optics, and paper or film whose sensitivity to light is such that overall system sensitivity lies substantially only in the visible light band, and wherein the record photolyzes very quickly to make the latent trace visible without the need for or the delays inherent in a wet developing process.

Another object of the invention is to provide a direct recording device and system for recording data at high speed, utilizing a beam of visible light which has no inertia, reflected from a mirror of a high frequency galvanometer device to a moving chart of paper which is highly sensitive to the visible light to establish a latent trace which over a short period of time photolyzes in ordinary light to quickly present a visible trace.

Still another object of the invention is to provide a direct recording device and system in accordance with the above object, and wherein the latent trace almost instantaneously photolyzes in ordinary visible room light to present a visible trace.

Still another object of the invention is to provide a high speed direct recording device and system in which incandescent light is used with visible light sensitive paper and inexpensive glass optical elements to record a latent image which can be made visible in a short period of time by photolyzation or secondary exposure to ordinary light, or which can be made visible almost instantly by short secondary exposure to ultraviolet light, or which can be made permanently visible by wet or photographic development.

Another object of the invention is to provide a light beam system for direct recording of data on sensitized film or paper, wherein the light intensity is changed in accordance with the speed at which the film or paper is driven.

For a better understanding of the present invention, together with other and further objects thereof, reference is had to the following description taken in connection with the accompanying drawings, and its scope will be pointed out in the appended claims.

An aspect of the invention lies in the provision of a device for direct recording of data on film or sensitized paper at a writing speed up to about 40,000 inches per second, utilizing a source of light rich in energy in the visible range of wave lengths, and a film or sensitized paper which is sensitive to light in the visible band of wave lengths and which is substantially insensitive to at least some wave lengths outside of the visible range. Galvanometer means which include a mirror is used for reflecting the light from the source to the film in accordance with data to be recorded. Visible light is used and optical elements of ordinary glass which is transparent to visible light and which filters out the ultraviolet rays are located between the source and the mirror and between the mirror and the film or sensitized paper for collecting light from the source and concentrating it on the film or paper as a small point or dot. The intensity of the visible light and the light-gathering power of the optical elements is correlated with the sensitivity of the film or paper and the size of the mirror to establish a latent image on the film or paper at a linear rate of up to about 40,000 inches per second, and means are provided for moving the film or paper.

FIGURE 2 is a graph indicating the several factors in the over-all system which are correlated to establish a visible light sensitive, direct recording, substantially instantaneous, dry system.

Figure 1:
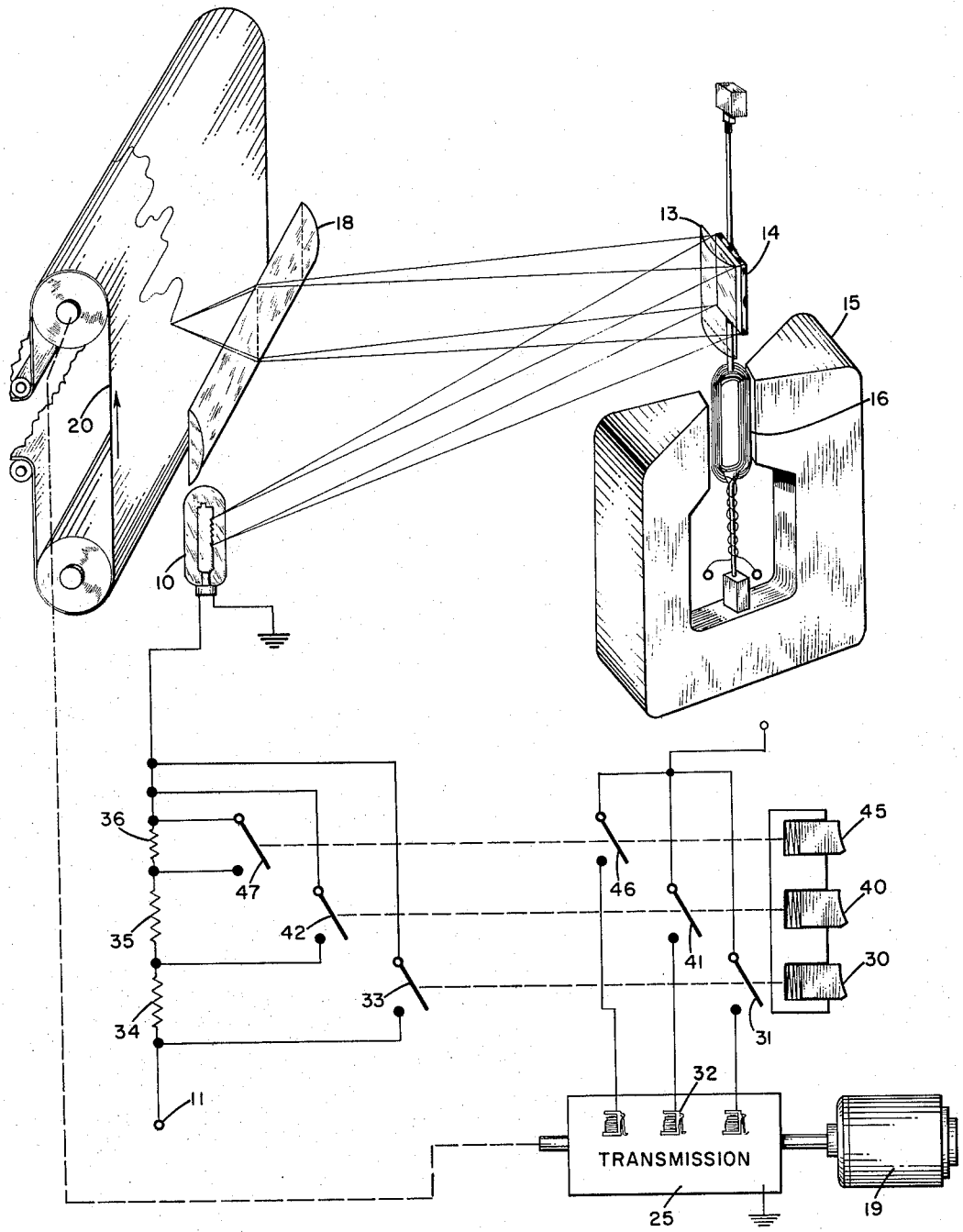
FIGURE 1 shows a schematic lay-out of the elements of the invention.

With reference to FIGURE 1 the source of visible light is identified by the reference character 10 and is an incandescent light with a glass bulb. Specifically, the light source may be a tungsten, zirconium or tantalum carbide light and surprisingly the light need be only about 10 watts. A 15 volt A.C. source 11 is used to energize it. The bulb emits light substantially in the visible and infrared wave lengths. It also may emit some light energy in the ultraviolet wave length, though this is very low. The light 10 may be a point or line source, the tungsten and tantalum carbide lamps being line sources and the zirconium lamp being a point source. Lens 13 is made of ordinary flint glass which is essentially opaque to ultra-violet light and it focuses the light from source 10 onto a mirror 14 which is part of a galvanometer 15. The electrical input to coil 16 of the galvanometer comes from a source of data to be recorded and, as is well known in the oscillograph art, the mirror vibrates in accordance with the input signal. Mirror 14 reflects the visible light through the ordinary flint glass optical element 13 and through another ordinary flint glass optical element 18 to a strip of film or sensitized paper 20 which is driven by a motor 19. Optical element 18 focuses the light on the film as a small dot, thereby providing very intense light concentration. While flint glass is preferred for the optical elements, any glass may be utilized which readily transmits visible light from the energy source to the recording paper. Preferably the glass filters out the ultraviolet rays. Ordinary window glass has this property, but the flint glass is preferred for its superior optical properties.

The mirror is .10" wide and is .225" high, which is large for galvanometers of the type disclosed in this invention, and, as shown by the drawing, the optical element 13 applies light to the entire area of the mirror 14. By using a large mirror the system is able to reflect much more light to the optical element 18 and through the element 18 to the paper 20 in the form of a highly concentrated dot of light.

The film or sensitized paper 20 may be DuPont DXB–504, MRK 376 or MRK 878 chart paper, or it may be Eastman KIND 1691. These papers are sensitive to light in the visible band of wave lengths, and they will not record appreciable energy in the infrared wave lengths. They may be sensitive in the ultraviolet region because the light source is poor in the ultraviolet rays and the glass optical elements filter out much of the ultraviolet energy. This paper is somewhat similar to the Linograph 5 paper used with the mercury arc ultraviolet light systems, but it has been dye sensitized to shift its response from the ultraviolet up into the visible range but not into the infrared range. Thus the paper acts as a filter to cooperate with the light source whose energy in the ultraviolet wave lengths is low compared to its energy in the visible range and with the filtering effect of the glass opical elements whose transmission of ultraviolet is low. Thus the light source 10 with its glass bulb, the ordinary flint glass optical elements 13, 18, and the paper 20 cooperate to form an over-all system wherein substantially only visible light is reproducibly recorded, and the reproduced record is not dependent to any substantial degree on the amount of energy in the ultraviolet or infrared wave lengths.

In FIGURE 2 there is shown by a series of curves the several factors in the over-all system which are correlated to establish a visible light sensitive, direct recording, substantially instantaneous, dry recording system. Curves A and E show the spectral response of three commercially available direct writing oscillograph papers in the ultraviolet, visible and infrared regions. Curve A being for Du Pont MRK 376 and 878 papers, and curve E being for Du Pont DXB 504 paper. These papers are sensitive in the ultraviolet and visible ranges but have no sensitivity in the infrared rgeion. Eastman KIND 1691 has a curve which is quite similar to curve A.

Curve B shows the emission of tungsten at 3220° K., with virtually no energy below 4000 A., the accepted division between the ultraviolet and visible light regions, but rich in energy in the infrared region about 7500 A., the accepted division between the visible and infrared regions.

Curve C indicates the ability of flint glass to transmit energy over a broad range of wave lengths. Throughout the visible and into the infrared range it is substantially linear, but it drops off sharply below 4000 A., in the ultraviolet region.

Curve D indicates the over-all system sensitivity when MRK 376 or MRK 878 paper is used, and it is represented by the equation $A \cdot B \cdot C = D$.

Curve F indicates the over-all system sensitivity when DXB 504 paper is used, and it is represented by the equation $E \cdot B \cdot C = F$.

It will be seen that even though incandescent light is rich in energy in the infrared region, and even though flint glass will transmit this energy, the over-all system is not sensitive to energy above the visible range because the paper is completely insensitive to such energy. It is also to be noted that even though the papers may be sensitive to energy in the ultraviolet region the overall system sensitivity is not dependent thereupon to any large extent because incandescent light is poor in ultraviolet energy and glass which is used filters out most of the ultraviolet rays below about 3500 A. Consequently, for the MRK 376 and 878 papers about 90% of the system sensitivity lies in the visible region, and for the DXB 504 paper about 95% lies in the visible region.

The previously required very high intensity mercury arc lamps are no longer necessary in order to get high writing speeds and prompt dry reproduction of the record, and all of the dangers and disadvantages and increased expense of the mercury arc system are obviated.

The trace which is recorded on the sensitized paper or film 20 is in the form of a latent image, and a secondary exposure to less intense light is necessary to bring out the latent trace into the form of a visible trace. The length of time of secondary exposure to less intense light varies with the amount of light which formed each incremental part of the latent image and with the intensity of the source of the light for secondary exposure. If substantially instantaneous development of the latent image is desired, exposure to intense light is advised, or the film or paper may be heated.

The mechanism of latensification is explained for ultraviolet sensitive papers by Heman D. Hunt, in an article published in volume 5, No. 2, of the March–April 1961 issue of Photograph Science and Engineering, pages 104 to 108, and further information on "latensification" is available in volume 5, No. 1, January–February 1961 issue of the same journal, in an article by John H. Jacobs.

Films and papers which are sensitive to visible light are believed to operate in substantially the same manner as the ultraviolet sensitive paper referred to in the Hunt article did when exposed to very high intensity light from a mercury lamp.

The light sensitive paper or film of the present system, when energized by intense visible light and subsequently exposed for a short period of time to a secondary and much less intense visible radiation, quickly provides a visible record. In either process, however, subsequent long exposure to bright daylight tends to cause the background of the film or paper to gradually darken, and thereby the contrast with the trace is gradually lost.

If the operator wishes a permanent record, the latent image may be developed by a wet process, similar to the development of photographic film, and thereafter the record will be permanent. Similarly, the latensified visible trace may be permanently fixed by a subsequent wet developing process and thereafter there will be no further deterioration of the record.

Thus there is for the first time provided by the device of the present invention, a substantially instantaneously available direct record on film or sensitized paper wherein the recording may be made at a rate exceeding about 20,000 inches per second, utilizing a broad band light source whose useful rays are in the visible range.

To obtain the extremely fast writing speeds it is important that light from the small incandescent source 10 be carefully collected and conserved by the optical elements and by the mirror 14, and it is important that the mirror be as large as possible. The limiting factor being the ability of the galvanometer to vibrate the mirror at a high frequency and through a sufficiently wide angle to establish on the paper a high frequency trace of adequate amplitude and of good contrast after latensification even though the chart paper was running at high speed.

The device of the present invention is actuated by motor 19 through a transmission or gear box 25. The details of the transmission are shown and claimed in an application, Serial No. 153,177, for Letters Patent filed on November 17, 1961 in the name of Earl O. Schweitzer, now Patent No. 3,156,319, and assigned to the same assignee as the present application. Briefly, the transmission comprises a plurality of gear stages which are pushbutton controlled to electrically energize solenoids to select any one of a large number of chart speeds ranging from .2 to 50 inches per second.

It has been found that the life of the bulb 10 can be greatly prolonged if it is operated below its peak of 15 volts. The peak voltage of course produces maximum brilliance from the bulb and is essential only if the chart is moving at or near its highest speed. For chart speeds below the highest the voltage on the light source is reduced.

For high speed operation pushbutton 30 is pushed, closing switch 31 which operates a solenoid 32 in transmission 25 to drive the chart at its highest speed. The operation simultaneously closes switch 33 which makes a circuit around resistors 34, 35, 36 and directly connects bulb 10 to voltage source 11. At medium chart speed pushbutton 40 is actuated to close switch 41 and reduce the chart speed, and to bypass resistors 35, 36, by making a circuit through switch 42 from the source 11 through resistor 34 to the bulb 10. Thus the voltage on the bulb is reduced and its life is prolonged while optimum recording conditions consistent with the chosen chart speed are obtained. For even lower chart speeds pushbutton 45 is actuated, closing switches 46 and 47 to select a low chart speed and for energing bulb 10 through resistors 34 and 35. Resistor 36 across switch 47 provides idling current to the lamp 10 when all switches 33, 42 and 47 are open. It is not essential to have a different voltage on the bulb for each different chart speed. For all practical purposes a unit with eight different chart speeds may need only three different voltage conditions.

While there have been described what are at present considered to be the preferred embodiments of this invention, it will obvious to those skilled in the art that various changes and modifications may be made therein without departing from the invention, and it is, therefore, aimed in the appended claims to cover all such changes and modifications as fall within the true spirit and scope of the invention.

We claim:

1. A system for the direct recording of data comprising in combination: a source of radiant energy having visible radiations with wave lengths which lie in the visible band of the frequency spectrum, a film which is sensitive to said visible radiations and which is essentially insensitive to energy whose wave lengths lie in the infrared range of the spectrum, said film having the ability to record a latent image when exposed to said visible radiations and to make said latent image visible by photolyzation, galvanometer means including a mirror for reflecting said visible radiations from said source to said film in accordance with data to be recorded, glass optical elements transparent to said visible radiations located between said source and said mirror for collecting said visible radiations from said source and concentrating them on said mirror, and other glass optical elements located between said mirror and said film for collecting said visible radiations from said mirror and concentrating them as an intense light spot on said film, said glass optical elements being essentially opaque to energy in the ultraviolet range of the frequency spectrum, whereby said system is sensitive substantially only to light in the visible range of frequencies, the intensity of said source of visible light and the light gathering power of said optical elements being such, when correlated with the sensitivity of said film and the size of said mirror, that a latent image can be recorded on said film at a linear rate of at least about 20,000 inches per second, and means for moving said film.

2. A system for the direct recording of data comprising in combination: a source of radiant energy emitting radiations which are relatively strong in the visible and infrared wave length ranges and relatively weak in the ultraviolet wave length range, a film which is sensitive to visible radiations in the visible range and whose sensitivity to radiations in the infrared ranges is low compared to its sensitivity to said visible radiations, said film having the ability to record a latent image when exposed to said visible radiations and to make said latent image visible by photolyzation, galvanometer means including a mirror for reflecting said visible radiations from said source to said film in accordance with data to be recorded, optical elements located between said energy source and said mirror and between said mirror and said film and comprised of glass whose ability to transmit energy in the ultraviolet range of frequencies is poor compared to its ability to transmit light in the visible range of frequencies for concentrating light energy from said source onto said film after reflection from said mirror and after substantially filtering out said ultraviolet radiations, the intensity of said source of energy in the ultraviolet, visible and infrared ranges and the selective radiation filtering ability of the optical elements and of the film being such that the said film reproduces energy lying essentially only in the visible range of wave lengths, and the intensity of said source of energy and the light gathering power of said optical elements and the size of said mirror being such, when correlated with the sensitivity of said film in the visible range of wave lengths, that a latent image can be recorded on said film at a rate at least about 20,000 inches per second, and means for moving said film while said latent image is being recorded thereon.

3. A system for the direct recording of data comprising, in combination, a source of energy emitting radiations which are relatively strong in the visible band of the frequency spectrum and which are relatively weak in the ultraviolet region, a film which is sensitive to energy having radiations whose wave lengths lie in the visible portion of the frequency spectrum and which is essentially insensitive to energy whose wave lengths are in the infrared range of the spectrum, said film having the ability to record a latent image when exposed to light and to make said latent image visible by photolyzation, selective means for driving said film at a selected one of a plurality of speeds, and changing means connected to said selective means and to said means for energizing said source of energy for changing the film speed and for changing the visible energy given off by said energy source, galvanometer means including a mirror for reflecting light from said source to said film in accordance with data to be recorded, optical elements relatively transparent to visible light located between said source and said mirror for collecting light from said source and concentrating it on said mirror and other optical elements located between said mirror and said film for collecting light from said mirror and concentrating it as an intense light spot on said film, said optical elements being relatively opaque to said relatively weak ultraviolet radiations, the intensity of said source of energy and the light gathering power of said optical elements being such, when correlated with the sensitivity of said film and the size of said mirror, that a latent image can be recorded on said film at a linear rate of at least about 20,000 inches per second, and means for moving said film.

4. A system for the direct recording of data comprising, in combination, a source of radiant energy having wave lengths which lie in the visible band of the frequency spectrum, a film which is sensitive at least to that portion of the radiant energy whose wave lengths lie in the visible band of the frequency spectrum and which is essentially insensitive to that portion of the energy whose wave lengths lie in the infrared range of the spectrum, said film having the ability to record a latent image when exposed to said visible radiations and to make said latent image visible by photolyzation, galvanometer means including a mirror for reflecting said visible radiations from said source to said film in accordance with data to be recorded, glass optical element means transparent to said visible radiations located in the path of said radiations between said source and said film for collecting said visible radiations and concentrating it on said film as an intense light spot, said glass optical elements being essentially opaque to radiations in the ultraviolet range of frequencies whereby said system is sensitive substantially only to radiations in the visible range of frequencies.

5. A device for direct recording of data comprising in combination: a source of incandescent light, means for energizing said source of light, a film which is sensitive to said light, galvanometer means for receiving said light and for reflecting said light onto said film in accordance with data to be recorded, selective means for driving said film at a selected one of a plurality of speeds, and changing means connected to said selective means and to said means for energizing said source of light for changing the film speed and for changing the brilliance of said light.

6. A device as set forth in claim 5, further characterized by said changing means decreasing the voltage on said light source as it decreases the film speed.

7. A device as set forth in claim 6, further characterized by said changing means decreasing the voltage on said light source as it decreases the film speed.

References Cited by the Applicant

UNITED STATES PATENTS

| | | |
|---|---|---|
| 1,789,689 | 3/1931 | Legg. |
| 1,871,380 | 8/1932 | Legg. |
| 2,604,955 | 7/1952 | Hawkins. |
| 2,613,127 | 10/1952 | Geiser. |
| 3,045,241 | 7/1962 | Savit. |

LEO SMILOW, *Primary Examiner.*